Patented July 24, 1951

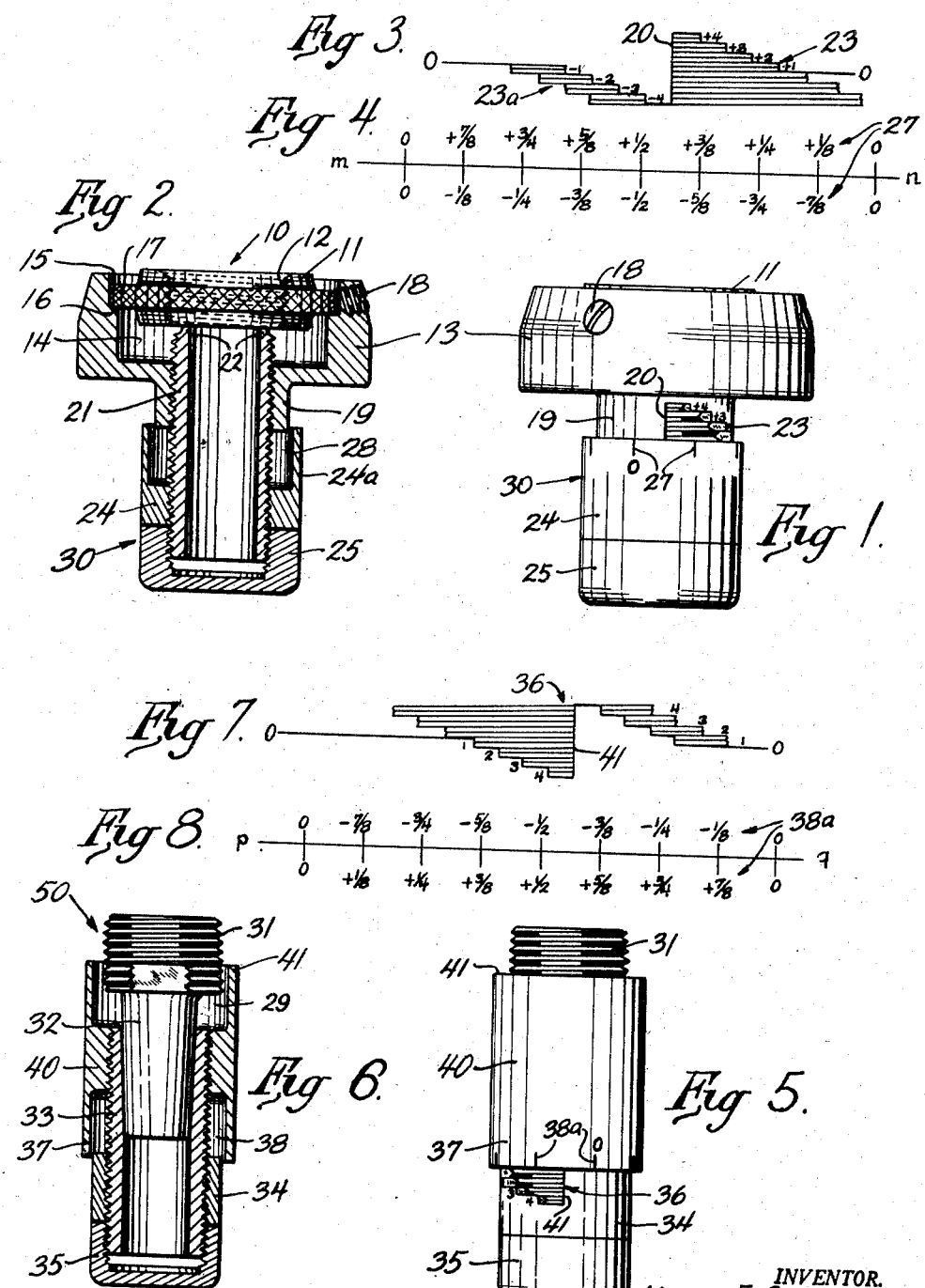

2,561,759

UNITED STATES PATENT OFFICE 2,561,759

PIPE THREAD GAUGE

Myron E. Steczynski, Chicago, Ill., assignor to Niles-Bement-Pond Company, West Hartford, Conn., a corporation of New Jersey Application August 14, 1944, Serial No. 549,353

4 Claims. (Cl. 33—199)

This invention relates to gauges for testing the accuracy of the pitch diameters of external and internal tapered pipe threads, and the like.

One of the objects of the invention is the provision of a new and improved pipe thread gauge having novel means for resetting or adjusting the indicating mechanism so that the gauge may be set by the aid of a master gauge to indicate approximately accurate readings.

Another object of the invention is the provision of new and improved gauge mechanisms that will test the accuracy of the pitch diameters of tapered pipe threads with great accuracy.

A further object of the invention is the provision of a set of tapered pipe thread gauges having a micrometer reading indicator for indicating at a glance the accuracy of the pitch diameters of internal and external tapered pipe threads expressed in turns and partial turns of the threads.

A still further object of the invention is the provision of a new and improved gauge that is very small in size and light in weight, and that has the scale so located that the readings may be made at a glance even to within fractions of a turn of the threads.

A still further object of the invention is the provision of new and improved mechanism for testing the accuracy of pitch diameters of threads; that is simple in construction, easily assembled and adjusted, composed of few parts; that is approximately accurate in measurements, and that is not likely to become broken or get out of order.

Other and further objects and advantages of the invention will appear from the following description, taken in connection with the accompanying drawings in which Fig. 1 is a side elevation of a gauge for testing and measuring the accuracy of the pitch diameters of tapered pipe threads;

Fig. 2 is a vertical section thereof;

Fig. 3 shows the indicating scale employed with the gauge illustrated in Figs. 1 and 2;

Fig. 4 shows the micrometer scale, developed;

Fig. 5 is a side elevation of a modified form of construction used for testing and measuring the accuracy of the pitch diameters of internal threads;

Fig. 6 is a vertical section thereof;

Fig. 7 shows the indicating scale on the gauge illustrated in Figs. 5 and 6 as developed; and Fig. 8 shows the micrometer scale, developed.

It is customary to measure external taper pipe threads with ring gauges and internal taper pipe threads with plug gauges. The gauges are screwed onto the part until they are fairly tight, and then the depth to which the two engage is observed. In the case of a ring gauge measuring an external pipe thread, the thread size is said to be basic when the end of the pipe is perfectly flush with the face of the gauge. In the case of a plug gauge measuring an internal pipe thread, the thread size is said to be basic when the notch on the plug gauge is perfectly flush with the face of the tapped hole. Any deviation from basic position is referred to in terms of the number of turns or fraction of a turn necessary to bring the two reference planes together.

If the external thread is too small in pitch diameter, or the internal thread is too large so that the parts screw in too far, the gauge can then be unscrewed to the approximate basic position and the number of turns actually counted. If, however, the external thread is too large in pitch diameter, or the internal thread is too small, the parts will not screw in far enough. It is then necessary to count and estimate the number of threads which separate the common reference planes. No exact means is provided to obtain an exact reading, unless perhaps a depth micrometer can be used to measure the separation of the two reference planes. It is common practice to limit the deviation from basic size to one turn large or one turn small on both external and internal pipe threads.

The object of this invention is to provide a means for reading accurately the size of an external or internal tapered pipe thread, regardless of whether the part is over basic size or under basic size. One arrangement is for holding a standard ring gauge to read the size of external pipe threads, while the other arrangement is for holding a standard plug gauge to read the size of internal pipe threads.

Besides using this invention as an adjunct to basic standard gauges for measuring those threads which are engaged by hand only, they can likewise be used with gauges that measure the additional threads which are engaged when tightened with a wrench, thereby giving an indication of taper; also these gauges can be used with semi-truncated gauges which indicate the form of the thread; and, finally, they can be used with fully truncated gauges which measure the amount of truncation at the crests of the threads. All these measurements involve close readings for comparison—therefore the necessity of accurate determination is apparent.

All gauges used for actual checking, i. e., working gauges, are subject to apparent wear over a usable range, and this amount of wear must be taken into account at every gauging operation. It is customary to extend the wear to half a turn on both ring and plug gauges for pipe threads. This invention depends for its setting upon a master gauge mating with the working gauge, and will read correctly from the master gauge even if the working gauge is made or is worn from the true basic size. In this way the working gauge can be set and reset to read accurately, independently of the wear on said gauge.

The conventional tapered pipe thread gauge is usually calibrated to indicate what is termed "basic," "maximum" and "minimum" condition of the threads. In other words, if the pitch diameters of the threads are correct the scale will read zero or "basic," and if the pitch diameters are greater they are designated "plus" or "maximum"; if below, they are regarded as "minus" of "minimum."

These calibrations are expressed in terms of the number of threads or turns above or below a predetermined or basic position of the member being tested, as compared with a master gauge. The present invention indicates the theoretically accurate pitch diameters of the threads marked "zero" on the scale, as well as the number of turns and fractions thereof above or below the zero point. This results in more correct readings being made, and greater accuracy in information obtained from the tests.

Referring now to Figs. 1 to 4 of the drawings, the reference character 10 designates, generally, the gauge for testing the accuracy of the pitch diameters of tapered threads of an externally threaded member. The gauge comprises a head member 11, forming a ring member having internal threads 12 of the required taper and arranged axially of the head 11. Suitable means are provided for holding or positioning the head, and for rotating the same for applying it to a tapered threaded pipe or other member. In the form of construction shown in these figures, a holder or head support 13 is employed for this purpose. The holder or head support 13 may be of any suitable material, such as an organic plastic, either thermo-setting, as the phenol or urea aldehydes, or thermo-plastic of high melting point, as "Lucite" or the like, which may be pigmented to give any desired tint or color; or it may be of metal, if desired.

The holder or head support 13 is provided with a recess 14, having an outer counterbore or enlarged recess 15 forming a ledge or seat 16 on which the peripheral flange 17 of the head 11 is adapted to seat. The head is rigidly held in the counterbore on the ledge 16 by any suitable means, such as the set-screw 18. The head support 13 has an axial extension or scale-supporting member 19, which is provided with an axial internally threaded bore for receiving one end of a threaded anvil support 21.

Suitable means are provided for indicating the accuracy of the pitch diameters of the threads, as will now be described. The anvil support or threaded member 21 is threaded into the extension or scale supporting member 19, and carries on its inner end an anvil 22 which is adapted to engage the inner end of the pipe or other threaded member in testing the same. The threaded anvil support 21 has mountd thereon a micrometer indicator member 24, and an adjusting member or cap nut in the form of a jam nut 25. The indicator member 24 is held in adjustable position along the threaded stem or anvil support 21 by this jam nut 25. The micrometer indicator member 24 and nut 25 constitute what may be termed a handle 30 for adjusting the gauge mechanism. This micrometer indicator member has a counterbore 28, forming a sleeve portion 24ª that telescopes the scale supporting member 19.

The stem or scale supporting member 19 is provided on its exterior with a stepped scale 23 (Fig. 1), which may be on the periphery thereof, and the steps are numbered from 1 to 4 from a neutral or "basic" line marked 0—0, as shown as developed in Fig. 3. There is a scale both above and below the zero line, as shown at 23 and 23ª, respectively, in Fig. 3, and as will presently appear. Each step indicates a complete turn of the thread that is being tested, which means that the pitch diameters of the tested threads are substantially accurate, or are above or below the "basic" or accurate pitch diameter. A line 20 is also provided on the scale supporting member which extends longitudinally of the stem or extension 19, for assisting in determining the partial turns of the threads, as will be explained below. In reading the scale the notation for the step appearing just inwardly of the inner edge of the indicator member 24 indicates the reading in full turns of the threads.

Instead of a stepped notation printed or impressed on the surface of the scale supporting member 19 portions of the wall of said member may be cut away to form the steps 1, 2, 3 and 4 in the marginal edge of the opening formed by the cut-away portion. The full turns are visible over the inner edge of the indicator member 24.

Suitable means are also provided for indicating the partial turns of the thread that may be above or below the "basic" or zero reading, as will now be described. The micrometer indicator member 24 is graduated, as shown at 27 in Fig. 1, and as developed in Fig. 4. One of these marks is indicated zero, and since there are eight divisions each mark will differ from the other by an eighth of a turn of the micrometer indicator member, as measured from the line 20 on the scale supporting member 19. A complete rotation of the micrometer indicator member 24 advances that member a distance equal to the lead of the thread, i. e., the distance between two notations on the scale in Fig. 3.

In practice two notations are provided. One of them, viz. the one above the line $m$—$n$ in Fig. 4, indicates "plus" reading, i. e., the extent that the pitch diameters of the threads being tested are greater than the standard as measured by the gauge and expressed in turns, or partial turns, of the threads; while those below the line indicate the "minus" reading, i. e., they, taken in connection with the stepped notations at the left in Fig. 3, indicate to what extent the pitch diameters of the threads of the tested pipe are smaller than the standard or "basic."

In setting the gauge the handle 30 (Fig. 2) is rotated counterclockwise until the anvil 22 is withdrawn beyond the point where it will interfere with the insertion of the plug of the master gauge. The plug of the master gauge is then screwed into the head 11 to form a snug fit. The anvil 22 is then brought into contact with the inner end of the plug of the master gauge, after which the micrometer indicator 24 is adjusted along the anvil support until the inner edge of the member 24 indicates the line 0—0 and the zero on the scale 27 (Fig. 4) is opposite the line 20 (Fig. 1). The set or lock nut 25 is now tightened for holding the indicator member 24 in fixed position on the anvil support 21.

In the operation of the device the adjusting member 25 and the indicator member 24 are turned together to partially withdraw the anvil support 21 from the holder, after which the tapered threaded member to be tested is screwed into the head 17 until a snug fit is obtained. The handle 30 is now turned right-handed until the anvil 22 is brought into contact with the inner end of the tapered threaded member that is being tested, and it may be determined at a glance at the scale 23, 23ª, whether the tested threads meet the required accuracy. The upper edge of the micrometer indicator member 24 constitutes an indicator, and the number visible on such a scale just above the upper edge of the member 24, as viewed in Fig. 1, will indicate the number of threads above or below the zero mark. The scale is so constructed that the fractional part of a turn will be indicated by the micrometer indicator marks 27, as compared with the mark or line 20 as shown in Fig. 1.

The position of the indicating member 24, when a tapered thread member is screwed into the head 17 making a tight fit therein and simultaneously engaging the anvil 22 on the member 21, indicates at a glance whether the pitch diameters of the threads are "basic" or above or below "basic." If, when the member to be tested is screwed into the head 17, making a snug fit, the micrometer indicator must be turned right-handed beyond zero reading to cause the anvil to engage the inner end of the threaded member, then the pitch diameter of the threaded member is too great to be accurate. On the other hand, if it is necessary to unscrew the sleeve member 21 to such an extent that the reading on the scale must be below the zero mark in Fig. 3, then the pitch diameter of the threads is too small to be accurate. Usually the tolerances are one, sometimes two threads either way, and the tester can tell at a glance whether the threaded member should be discarded.

The tolerances may be much less, especially when the tested member is to be employed in exceedingly high pressures, as in hydraulic equipment, and the like, where pressures are sometimes very great. The micrometer scale reading mechanism under such circumstances becomes quite valuable, since the gauge is quite accurate in its measurements, and the gauge may be reset with a minimum of time and effort.

In Figs. 5, 6, 7 and 8 is shown a modified form of construction for use in measuring internal threads of members that are to be tested. In this form of construction a head member 31 of the gauge 50 is provided with external threads having a substantially accurate pitch diameter, and this head has an extension or shank 32 which is adapted to frictionally engage in a corresponding tapered opening in an externally threaded head support 33. By providing a tapered frictional engagement for this shank, interchangeable heads may be provided for use with the same handle or support.

A scale supporting member 34 is threaded on the lower end of the head supporting member 33, and is held in adjustable position along the same by a cap or set nut 35. The scale supporting member 34 is provided with a scale 36, corresponding to the scale 23, 23ª, shown in the previous construction. This scale may, if desired, be stepped, and may be formed on the peripheral surface of the scale supporting member 34, or formed on the margin of a window or cut-away portion in the wall of said member 34, as in the construction described above. The steps are arranged above and below a zero or "basic" line, as described above. Since the scale is similar to the scale 23, 23ª, already described, it is not thought necessary to repeat the description.

The steps may be numbered 1, 2, 3 and 4 in each direction from the "basic" or zero line 0—0, as shown in Fig. 7, and as explained in connection with the developed scale shown in Fig. 3. A micrometer indicator and anvil support 40 is provided for indicating the accuracy of the partial turns of the threads of an internal threaded member. This supporting member 40 has an enlarged counterbore 38, so that it may telescope over the scale supporting member 34. The upper end of the member 30 is also provided with a counterbore 29 for providing a clearance for the head 31.

The upper end of the supporting member 40 supports an anvil 41 integral therewith, and which is adapted to be brought into contact with an internal threaded member to be tested after the head 31 has been threaded into the same until it makes a snug fit. A micrometer indicator member 37 is carried by the lower end of the support 40 and is calibrated about its lower end, as at 38ª, the calibrations being 45° apart. One of these may be marked zero, as in the previous construction, and which is adapted to be set in alinement with the line 41 on the scale 36, as in the previous construction.

Two sets of calibrations 38ª are arranged to read in opposite directions, as shown above and below the line p—q in Fig. 8; the lower one as being marked plus to indicate that the pitch diameters of the threads being tested are above those of the "basic" or zero; while those above the line are marked minus, indicating that the pitch diameters are below "basic" or zero.

In testing the accuracy of the pitch diameters of the internal threads of a member, the anvil support 40, carrying the anvil 41 and the micrometer indicator 37, is first backed off a sufficient distance for the proper clearance of the parts, the head 31 is press fitted into the member being tested until a tight fit is obtained, and then the support 40 is screwed inward until the anvil 41 contacts the member being tested. The outer edge of the micrometer indicator will indicate the full turns read on the scale 36, whether plus or minus, and the scale mark 38 opposite the line 41 will indicate the partial turns of the thread, whether above or below "basic" or normal.

The gauges may be reset as often as desired for compensating for wear due to constant use. In setting or resetting the gauge 50 the head 31 is screwed into a master internally threaded gauge head until a snug fit is obtained, after which the support 40 is turned to bring the anvil 41 into contact with the head of the master gauge. The members 34 and 35 are then adjusted so that the lower or inner edge of the micrometer is at zero on the stepped scale, and the scale 38 has its zero opposite the line 41, after which the cap nut 35 is tightened to hold the scale support 34 in fixed position.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. A gauge for testing the accuracy of the pitch diameters of tapered threaded members, comprising a threaded head for engaging the threads of said members, a support for said head, a member having an anvil thereon threaded on said support whereby said anvil may be movable relative to said head for engaging the inner end face of a member to be tested, a scale supporting member, a scale on said member, a micrometer indicator member movable with said anvil member and graduated for cooperating with said scale for indicating the relative accuracy of the threads of the tested member expressed in turns and partial turns of said last-named threads above or below a predetermined standard, and means to adjust the axial and rotative position of said indicator member relative to said anvil and lock the same in adjusted position.

2. A tapered pipe thread gauge for testing the accuracy of the pitch diameters of the threads of a threaded member, comprising an internally threaded head, means for detachably supporting the same, an anvil for engaging the inner end of said member, said anvil being threaded to said support for said threaded member, a scale having notations thereon, and a micrometer indicator support for cooperating with said scale for indicating the accuracy of the pitch diameters of said threads on said member as expressed in turns and partial turns of said indicator member.

3. In a gauge for testing the accuracy of the pitch diameters of threads on a tapered threaded member, comprising an internally threaded head, a support for said threaded member, a scale on said support, an anvil for engaging the inner end of said threaded member, said anvil being threaded to said support for said threaded member, and a micrometer indicator member rotatable with said anvil and cooperating with said scale for indicating the comparative accuracy of the pitch diameters of the threads on said member.

4. In a gauge for testing the accuracy of the pitch diameters of tapered pipe threads, comprising an internally threaded head member, a support for said head, a scale on said support reading in terms of the turns of said tapered pipe threads both above and below a basic line, an anvil support, an anvil on said support for engaging the end of a threaded member that is being tested, said anvil being threaded to said support for said threaded member, a micrometer indicating member carried by said anvil support, and a micrometer scale carried by said indicating member whereby the turns and partial turns above and below "basic" will be indicated by said indicator member and scales.

MYRON E. STECZYNSKI.

REFERENCES CITED

The following references are of record in the file of this patent:

UNITED STATES PATENTS

| Number | Name | Date |
|---|---|---|
| 1,459,896 | John | June 26, 1923 |
| 1,602,645 | Buckingham | Oct. 12, 1926 |
| 1,829,797 | Hartness | Nov. 3, 1931 |
| 1,875,899 | Thomson | Sept. 6, 1932 |
| 2,200,885 | Johnson | May 14, 1940 |
| 2,330,453 | Smith | Sept. 28, 1943 |
| 2,339,699 | Husband | Jan. 18, 1944 |